Figure 1:
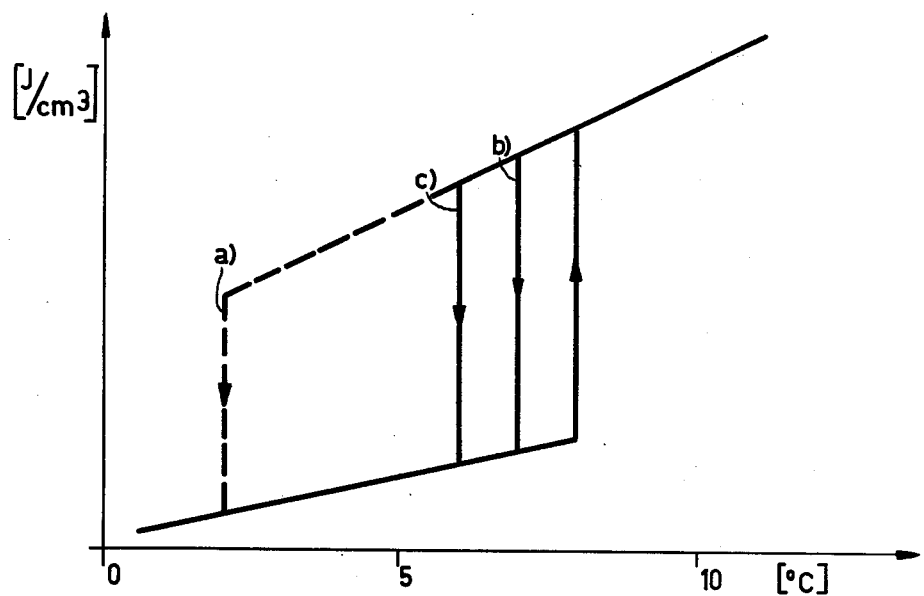

United States Patent [19]

Schroder et al.

[11] 4,189,393

[45] Feb. 19, 1980

[54] HEAT STORAGE MATERIAL COMPRISING LITHIUM CHLORATE-TRIHYDRATE AND A NUCLEATING AGENT

[75] Inventors: Johann Schröder; Klaus Gawron, both of Aachen, Fed. Rep. of Germany

[73] Assignee: U.S. Philips Corporation, New York, N.Y.

[21] Appl. No.: 922,827

[22] Filed: Jul. 10, 1978

[30] Foreign Application Priority Data

Jul. 13, 1977 [DE] Fed. Rep. of Germany ....... 2731573

[51] Int. Cl.$^2$ ............................................... C09K 5/06
[52] U.S. Cl. ..................................................... 252/70
[58] Field of Search .......................... 252/70; 126/400; 23/301

[56] References Cited

U.S. PATENT DOCUMENTS 4,057,101 11/1977 Ruka et al. ......................... 252/70 X

OTHER PUBLICATIONS

Berg, "New Hydrates of Lithium Chlorate," Z. Anorg. Allgem. Chem. 166, 231–236 (1927), CA22:737[7].

*Primary Examiner*—Harris A. Pitlick
*Attorney, Agent, or Firm*—Thomas A. Briody; William J. Streeter; Rolf E. Schneider

[57] ABSTRACT

A heat storage material comprising lithium chlorate-trihydrate as the heat storage medium and potassium perchlorate and/or sodium, potassium or barium hexafluorosilicate as the nucleating agent to reduce supercooling.

6 Claims, 2 Drawing Figures

HEAT STORAGE MATERIAL COMPRISING LITHIUM CHLORATE-TRIHYDRATE AND A NUCLEATING AGENT

This invention relates to a heat storage material comprising a salt hydrate as the heat storage medium and a nucleating agent.

Salt hydrates are very suitable heat storage materials, for example for heating and cooling systems in combination with heat pumps, solar collectors and remote-heating and heat recovering installations.

In U.S. application Ser. No. 676,649, filed Apr. 14, 1976, now U.S. Pat. No. 4,104,185, for example, there is disclosed a latent heat accumulator having a salt hydrate as the heat storage medium. There is, however, a great need to have at disposal additional heat storage materials having different melting points, adapted to the purposes for which they are intended.

The present invention therefore has for its object to provide a novel heat storage material comprising a salt hydrate and a nucleating agent.

In accordance with the invention this object is accomplished in that the heat storage material comprises lithium chlorate-trihydrate as the heat storage medium and potassium perchlorate and/or sodium, potassium or barium hexafluorosilicate as the nucleating agent.

Because of its particularly high heat of fusion (393 J/cm$^3$) and its advantageous melting point (8° C.), lithium chlorate-trihydrate LiClO$_3$.3H$_2$O is a very suitable heat storage material, especially for cooling purposes. It has, however, the disadvantage that it does not crystallize until it is supercooled approximately 6° C. Owing to this supercooling it is not possible to withdraw, at the melting point, the stored latent heat (heat of fusion), which results in faulty operation of the heat-storage and a considerable decrease of the efficiency of connected energy systems (heat pumps, for example). It is, therefore, a further object of the invention to materially eliminate such supercooling by the addition of a small quantity of KClO$_4$ (approximately 2% by weight) as a nucleating agent. Whereas, for example, without KClO$_4$ no crystallization occurs at 2° C. (that is to say at 6° C. supercooling), even after 1 hour, the entire storage mass has congealed already after only a few minutes at a supercooling of only 1° C. if 2% by weight of KClO$_4$ is added to LiClO$_3$.3H$_2$O.

Further suitable, but somewhat less efficient, nucleating agents are the hexafluorosilicates of sodium, potassium and barium. In concentrations of >0.68% by weight for Na$_2$SiF$_6$, >0.15% by weight for K$_2$SiF$_6$ and >2.2·10$^{-2}$% by weight of BaSiF$_6$ they reduce the degree of supercooling from approximately 8° C. to approximately 2° to 3° C. In cases where a small degree of supercooling of 2° to 3° C. makes no difference it is therefore advantageous to use these nucleating agents as they are effective in smaller quantities than KClO$_4$, and are less expensive.

In view of the above it is advantageous to use the nucleating agents in the following ratios of mix, relative to 100 g of water:

KClO$_4$: 1.7 to 4% by weight, in particular 1.9 to 2.5% by weight;

Na$_2$SiF$_6$: 0.7 to 2% by weight, in particular 0.9 to 1.5% by weight;

K$_2$SiF$_6$: 0.15 to 2% by weight, in particular 0.3 to 1.0% by weight;

BaSiF$_6$: 0.02 to 2% by weight, in particular 0.05 to 1.0% by weight.

Figure 2:
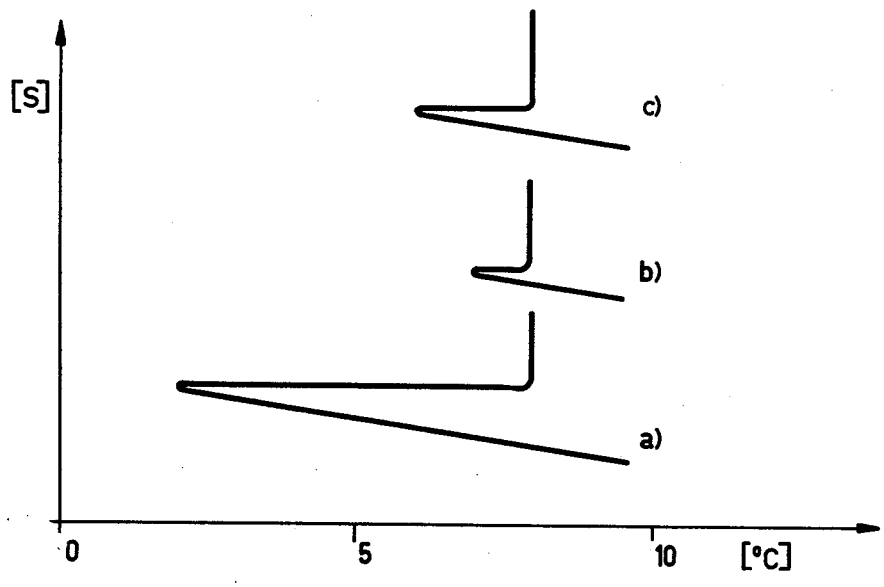

The invention will now be further explained with refernece to the accompanying drawing in which FIG. 1 shows a graphic representation of the heat contents of LiClO$_3$.3H$_2$O, that is to say the dependence of the heat of fusion and the specific heat (solid, liquid) on the temperature, and FIG. 2 shows cooling curves, that is to say the relative variation of the cooling versus the time.

In the FIGS.

(a) stands for LiClO$_3$.3H$_2$O without a nucleatng agent;
(b) ditto, with nucleating agen KClO$_4$;
(c) ditto, with either of the nucleating agents
   Na$_2$SiF$_6$;
   K$_2$SiF$_6$;
   BaSiF$_6$.

FIG. 1 shows that LiClO$_3$.3H$_2$O melts at 8° C. (arrow points upwards) while on congealing (arrow points downwards) a more or less pronounced supercooling is produced.

In FIG. 2 the curves of the systems (a), (b) and (c) are shifted relative to one another with respect to time for the sake of clarity. As in FIG. 1 also here the supercooling effects for system (a), having no nucleating agent, and for the systems (b) and (c), which do contain nucleating agents, are clearly noticeable.

What is claimed is:

1. A heat storage material comprising lithium chlorate-trihydrate as the storage medium and potassium perchlorate and/or sodium potassium or barium hexafluorosilicate as a nucleating agent.

2. A heat storage material according to claim 1, in which the nucleating agent is present in a quantity of 0.02 to 4% by weight, relative to 100 g of water.

3. A heat storage material according to claim 1, in which the nucleating agent is potassium perchlorate in a quantity of 1.7 to 4% by weight, relative to 100 g of water.

4. A heat storage material according to claim 1, in which the nucleating agent is sodium hexafluorosilicate in a quantity of 0.7 to 2% by weight, relative to 100 g of water.

5. A heat storage material according to claim 1, in which the nucleating agent is potassium hexafluorosilicate in a quantity of 0.15 to 2% by weight, relative to 100 g of water.

6. A heat storage material according to claim 1, in which the nucleating agent is barium hexafluorosilicate in a quantity of 0.02 to 2% by weight, relative to 100 g of water.

* * * * *